United States Patent [19]

Tsuji et al.

[11] Patent Number: 5,758,311
[45] Date of Patent: May 26, 1998

[54] VIBRATION/NOISE ACTIVE CONTROL SYSTEM FOR VEHICLES

[75] Inventors: Takayuki Tsuji; Hideshi Sawada; Hisashi Sano, all of Wako, Japan

[73] Assignee: Honda Giken Koygo K.K., Tokyo, Japan

[21] Appl. No.: 403,677

[22] Filed: Mar. 14, 1995

[30] Foreign Application Priority Data

Mar. 16, 1994 [JP] Japan .................. 6-071434

[51] Int. Cl.$^6$ .................. G01K 11/16; H63H 17/34
[52] U.S. Cl. .................. 701/111; 381/71.01; 381/71.04
[58] Field of Search .................. 381/71.01, 74, 381/71.4, 86, 71.09; 364/431.01, 431.08, 508

[56] References Cited

U.S. PATENT DOCUMENTS

| | | | |
|---|---|---|---|
| 4,506,380 | 3/1985 | Matsui | 381/71.04 |
| 5,018,202 | 5/1991 | Takahashi et al. | 381/71.04 |
| 5,022,082 | 6/1991 | Eriksson et al. | 381/71.04 |
| 5,245,664 | 9/1993 | Kinoshite et al. | 381/71.04 |
| 5,251,262 | 10/1993 | Suzuki et al. | 381/71.04 |
| 5,384,853 | 1/1995 | Kinoshita et al. | 381/71.04 |
| 5,410,604 | 4/1995 | Saito et al. | 381/71.04 |
| 5,416,846 | 5/1995 | Tamura et al. | 381/71.04 |

FOREIGN PATENT DOCUMENTS

5-158487  5/1993  Japan .................. G10K 11/16

OTHER PUBLICATIONS

Improve Noise Canceller performance by means of an adaptive arrangement of IIR and IIR filter, C.P. Dowing, FM Boland, JB Foley, 1989. Feb. 1989, pp. 2005–2008.

Noise Cancellation for hearing aids Dan Chazan, Y. Medan, Vzi, pp. 1697–1705 Nov. 1988, IEEE Transaction on Acoustic, speech, and Signal Processing, vol. 36, No. 11.

Adaptive Homonic Noise Cancellation with Application of distribution Power lines Communications, Jin–Der Wang, Joel Trussell, vol. 36, No. 7, Jul., 1988 IEEE transaction on Communications pp. 875–884.

*Primary Examiner*—Jacques Louis-Jacques
*Assistant Examiner*—Herbert McNair
*Attorney, Agent, or Firm*—Arthur L. Lessler

[57] ABSTRACT

A vibration/noise active control system for automotive vehicles which generates a canceling signal for canceling vibrations and noises generated within the compartment of the vehicle, based on a reference signal related to the vibrations and noises by means of an adaptive filter. The canceling signal is converted into a canceling sound. The adaptive filter has a filter coefficient thereof changed based on the cancellation error between the canceling sound and the vibrations and noises within the compartment, detected by an error sensor, and the reference signal. A memory stores a plurality of filter coefficient values of the adaptive filter corresponding to a plurality of predetermined traveling conditions of the vehicle. A discriminator reads out a filter coefficient value of the adaptive filter corresponding to the detected predetermined traveling condition of the vehicle, supplies the read-out filter coefficient value to the adaptive filter to generate the canceling signal, and stores a filter coefficient value of the adaptive filter which has been changed based on the generated canceling signal.

3 Claims, 13 Drawing Sheets

FIG.5

| ADDRESS | W |
|---|---|
| 0 0 0 1 | FILTER COEFFICIENT VALUE TRAIN 1 |
| 0 0 0 2 | FILTER COEFFICIENT VALUE TRAIN 2 |
| ⋮ | ⋮ |
| B | FILTER COEFFICIENT VALUE TRAIN 11 |
| ⋮ | ⋮ |

5,758,311

VIBRATION/NOISE ACTIVE CONTROL SYSTEM FOR VEHICLES

BACKGROUND OF THE INVENTION

1. Field of the Invention

This invention relates to a vibration/noise active control system for automotive vehicles, which actively controls vibrations occurring in the vehicle during traveling thereof, etc., and noises ascribable to the vibrations, especially road noises, so as to reduce the vibrations and noises.

2. Prior Art

A vibration/noise active control system of this kind has been conventionally known, for example, from Japanese Laid-Open Patent Publication (Kokai) No. 5-158487.

The known vibration/noise active control system is constructed as shown in FIG. 1: Vibrations input from a road surface are detected by a suspension acceleration sensor 101 arranged on a suspension device of the chassis of an automotive vehicle, and at the same time road noises generated within the compartment of the vehicle are detected by microphones 102a to 102h arranged within the compartment. A transfer characteristic (filter coefficient) W, which is inverse to the transfer characteristic peculiar to the vibration transmission control path extending from the suspension acceleration sensor 101 to the microphones 102a to 102h, is identified by an adaptive controller (LMS) 103. Then, a signal having a waveform inverse in phase to that of the road noises is generated by an adaptive digital filter 104, based on the thus identified transfer characteristic W, and then a sound (control sound) having a waveform inverse in phase to that of the road noises is generated by loudspeakers 105a to 105d, to thereby reduce the road noises within the compartment.

The known vibration/noise active control system constructed as above has the following features in order to cope with a drastic change in the transfer characteristic during sudden acceleration of the vehicle, by the use of an identification system with low performance:

1. Estimating means (suspension acceleration sensor 101) estimates a change in the transfer characteristic. Determining means (determining circuit 106) determines whether or not the change estimated by the estimating means exceeds a predetermined value. An adaptive control-inhibiting switch 107 inhibits the operation of the adaptive controller (LMS 103) in response to an output signal from the determining means, or a control sound-inhibiting switch 108 is operated to inhibit generation of the control sound, in response to the output signal, when it is determined that the change exceeds the predetermined value.

2. The estimating means estimates a change in the transfer characteristic. Memory means stores a plurality of correction values corresponding to changes in the transfer characteristic. Correcting means selects a desired correction value from the correction values, according to the estimated change, to thereby correct the control sound 3. The estimating means estimates a change in the transfer characteristic, based on a signal indicative of a change in the position of the chassis of the vehicle, detected by position-detecting means. The position change-detecting means is specifically formed of the chassis acceleration sensor, a throttle valve opening sensor, a brake sensor, or a rudder angle/angular velocity sensor.

An embodiment of the known system having the feature 1 is exemplified in FIG. 1, while embodiments thereof having the features 2 and 3 are not illustrated.

However, according to the above known vibration/noise control active control system, when it is used to control noises input from a plurality of different portions of the vehicle chassis, such as road noises, it has to control vibrations and noises not only caused by a sudden change in the position of the vehicle chassis ascribable to sudden acceleration but also vibrations and noises caused by a change in the road surface state or a change in the vehicle speed occurring when the road surface is not changed. Therefore, it is difficult to effectively reduce the level of vibrations and noises to a practically acceptable low level, due to a low identifying speed at which the transfer characteristic can be identified. To meet requirements for quick identification of the transfer characteristic, it is necessary to employ an identification system with high performance, which unfavorably leads to a high production cost.

SUMMARY OF THE INVENTION

It is an object of the invention to provide a vibration/noise active control system for automotive vehicles, which is capable of quickly responding to changes in the transfer characteristic of the vibration/noise transmission control path, which depend on traveling conditions (vehicle speed, road surface state, riding state) of the vehicle, even if it employs an identification system with low performance and small in size, to thereby curtail the production cost.

To attain the above object, the present invention provides a vibration/noise active control system for an automotive vehicle having a compartment, comprising:

reference signal-detecting means for detecting a signal related to vibrations and noises generated within the compartment, as a reference signal;

canceling signal-forming means having an adaptive filter, for forming a canceling signal for canceling the vibrations and noises, by means of the adaptive filter, based on the reference signal;

converting means for converting the canceling signal formed by the canceling signal-forming means into a canceling sound;

error-detecting means for detecting a cancellation error between the canceling sound from the converting means and the vibrations and noises within the compartment to generate an error signal;

filter coefficient-changing means for changing a filter coefficient value of the adaptive filter, based on the error signal and the reference signal;

memory means for storing a plurality of filter coefficient values of the adaptive filter corresponding to a plurality of predetermined traveling conditions of the vehicle;

traveling condition-detecting means for detecting a traveling condition in which the vehicle is traveling; and control means for reading out a filter coefficient value of the adaptive filter corresponding to one of the predetermined traveling conditions of the vehicle to which the traveling condition detected by the traveling condition-detecting means corresponds, supplying the read-out filter coefficient value to the canceling signal-forming means to form and generate the canceling signal based on the read-out filter coefficient value, and storing the filter coefficient value of the adaptive filter changed by the filter coefficient-changing means based on the generated canceling signal.

In a preferred form of the invention, when a change occurs in the traveling condition detected by the traveling condition-detecting means, the control means writes into the memory means a filter coefficient value of the adaptive filter corresponding to one of the predetermined traveling conditions to which the traveling condition detected by the traveling condition-detecting means immediately before occurrence of the change corresponds, and reads out from the memory means a filter coefficient value of the adaptive filter corresponding to one of the predetermined traveling conditions to which the traveling condition detected by the traveling condition-detecting means immediately after occurrence of the change corresponds, to thereby cause the canceling signal-forming means to form and generate the canceling signal based on the read-out filter coefficient.

In another preferred form of the invention, the memory means comprises first memory means storing initial filter coefficient values of the adaptive filter set beforehand, in a manner corresponding to the predetermined traveling conditions, and second memory means for storing filter coefficient values of the adaptive filter changed by the filter coefficient-changing means in a manner corresponding to the predetermined traveling conditions, and wherein when a change occurs in the traveling condition detected by the traveling condition-detecting means, the control means reads out from the first memory means an initial filter coefficient value corresponding to one of the predetermined traveling conditions to which the traveling condition detected by the traveling condition-detecting means immediately before occurrence of the the change corresponds, reads out from the second memory means a filter coefficient value corresponding to one of the predetermined traveling conditions to which the traveling condition detected by the traveling condition-detecting means immediately after occurrence of the change corresponds, causes the canceling signal-forming means to form and generate the canceling signals based, respectively, on the initial filter coefficient value read out from the first memory means and the filter coefficient value read out from the second memory means, to execute vibration/noise control based on the generated canceling signals, and selects one of the initial filter coefficient value read out from the first memory means and the filter coefficient value read out from the second memory means, which has resulted in a smaller cancellation error, to apply same as an initial value of the adaptive filter.

In a further preferred form of the invention, when a change occurs in the traveling condition detected by the traveling condition-detecting means, the control means causes the canceling signal-forming means to form and generate the canceling signal, based on a filter coefficient value of the adaptive filter changed by the filter coefficient-changing means immediately before occurrence of the change, and executes vibration/noise control based on the generated canceling signal, causes the canceling signal-forming means to form and generate the canceling signal, based on a filter coefficient value of the adaptive filter read out from the memory means according to the traveling condition detected by the traveling condition-detecting means immediately after occurrence of the change, and selects one of the filter coefficient value changed by the filter coefficient-changing means immediately before occurrence of the change and the filter coefficient value read out from the memory means immediately after occurrence of the change, which has resulted in a smaller cancellation error, to apply same as an initial value of the adaptive filter.

Preferably, the memory means comprises first memory means for storing filter coefficient values of the adaptive filter changed by the filter coefficient value-changing means in a manner corresponding to the predetermined traveling conditions, and second memory means for temporarily storing a filter coefficient of the adaptive filter changed by the filter coefficient value-changing means when a change occurs in the traveling condition detected by the traveling condition-detecting means, and wherein when the change occurs in the traveling condition detected by the traveling condition-detecting means, the control means writes the filter coefficient value changed by the filter coefficient value-changing means immediately before occurrence of the change into the second memory means, causes the canceling signal-forming means to form and generate the canceling signal, based on the filter coefficient value of the adaptive filter changed by the filter coefficient-changing means immediately before occurrence of the change, executes the vibration/noise control based on the generated canceling signal, causes the canceling signal-forming means to form and generate the canceling signal, based on the filter coefficient value of the adaptive filter read out from the first memory means according to the traveling condition detected by the traveling condition-detecting means immediately after occurrence of the change, and selects one of the filter coefficient value changed by the filter coefficient-changing means immediately before occurrence of the change and the filter coefficient value read out from the first memory means immediately after occurrence of the change, which has resulted in a smaller cancellation error, to apply same as the initial value of the adaptive filter.

Advantageously, the traveling condition of the vehicle includes at least one of traveling speed of the vehicle, a state of a road surface on which the vehicle is traveling, and a riding state of the vehicle.

The above and other objects, features and advantages of the invention will become more apparent from the following detailed description taken in conjunction with the accompanying drawings.

BRIEF DESCRIPTION OF THE DRAWINGS

FIG. 5 shows, a map used for determining a filter coefficient of the system of FIG. 2;

DETAILED DESCRIPTION

The invention will now be described in detail with reference to the drawings showing embodiments thereof.

In the following embodiments, the vibration/noise active control system of the present invention is applied to a road noise-reducing system (road noise canceler). Road noise control is generally carried out in response to signals input to the road noise canceler from a plurality of input points, e.g. from suspension acceleration sensors arranged on suspension devices supporting the chassis of an automotive vehicle and hence vibration/noise active control systems of this kind in general employ a multiple channel system. However, the essential feature of the present invention can be described by referring to a vibration/noise active control system employing the single channel system, and therefore the following embodiments will be described and illustrated as employing the single channel system for simplicity of the description.

Figure 1:
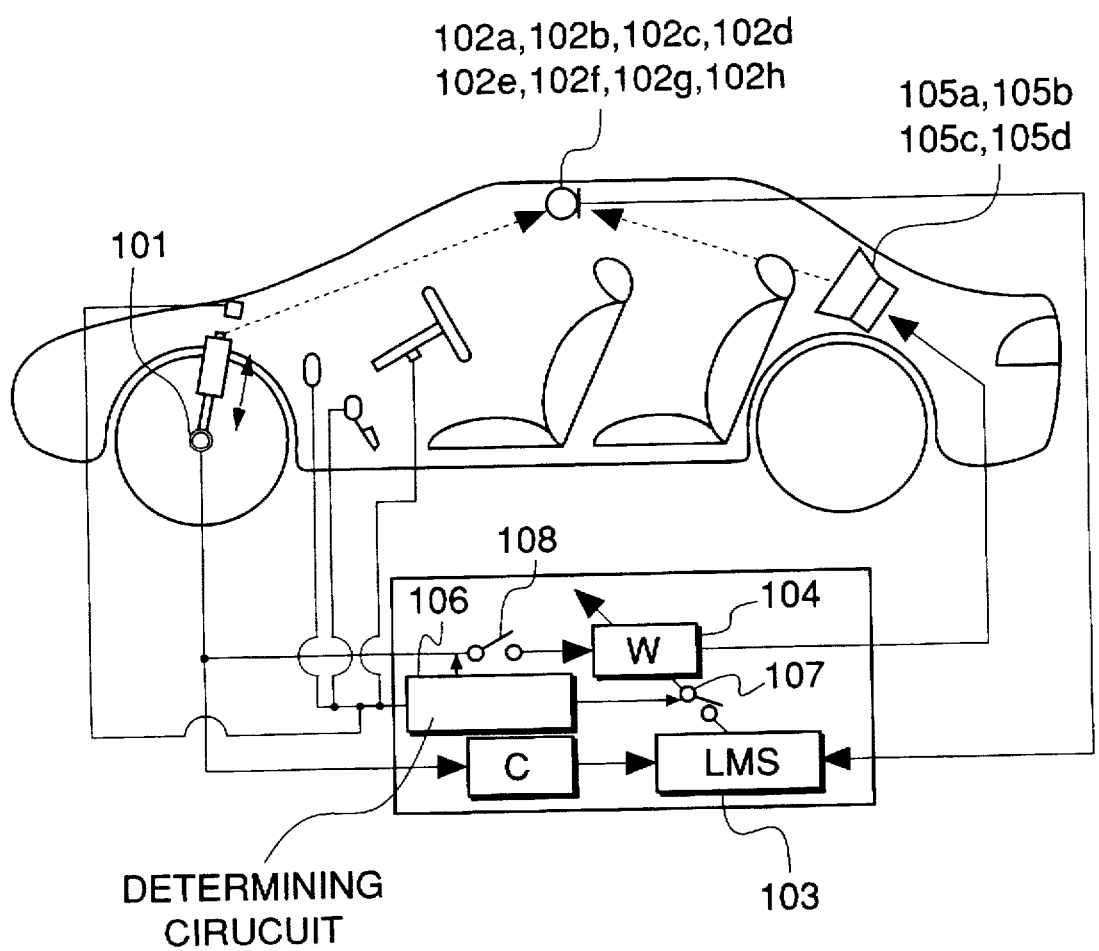
FIG. 1 is a block diagram schematically showing the arrangement of a conventional vibration/noise active control system.
Figure 2:
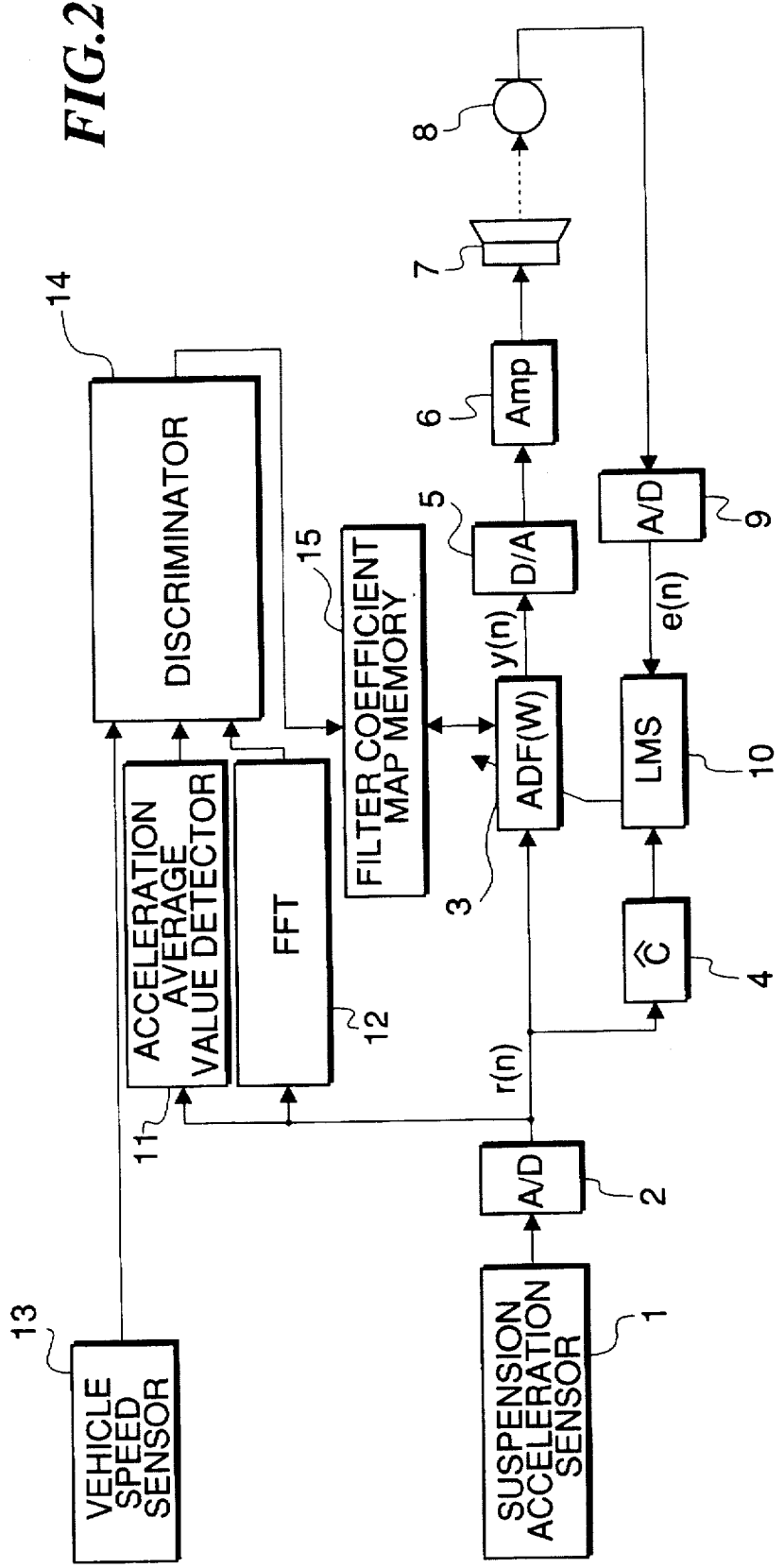
FIG. 2 is a block diagram schematically showing the whole arrangement of a vibration/noise active control system according to a first embodiment of the invention.

Referring first to FIG. 2, there is schematically illustrated the whole arrangement of a vibration/noise active control system for automotive vehicles, according to a first embodiment of the invention.

In the figure, reference numeral 1 designates a suspension acceleration sensor mounted on a predetermined suspension device of the vehicle, for detecting acceleration of vibrations of the suspension device.

The suspension acceleration sensor I is connected via an A/D converter 2, which converts an analog signal output from the sensor I to a digital signal, to an adaptive filter (ADF) 3, which generates a canceling signal, based on a transfer characteristic (filter coefficient) W inverse to a transfer characteristic peculiar to a transmission control path extending from the suspension acceleration sensor 1 to a microphone 8, a digital filter 4, referred to hereinafter, having a transfer characteristic Ĉ which has been identified with the transfer characteristic of a path extending from a loudspeaker 7 to the microphone 8, a suspension acceleration average value detector 11, referred to hereinafter, and a high-speed Fourier transformer (FFT) 12, referred to hereinafter.

The ADF 3 is connected to a D/A converter, which converts the canceling signal y(n), which is a digital signal, output from the ADF 3 into an analog canceling signal. The D/A converter 5 is connected to an amplifier 6, which amplifies the analog canceling signal from the D/A converter 5 and delivers the amplified signal to the loudspeaker 7, which converts the canceling signal into a canceling sound.

The canceling sound generated from the loudspeaker 7 interferes with a road noise within a controlled space, i.e. the vehicle compartment, and the interference result (residual noise) is detected as a cancellation error by the microphone 8 arranged at a predetermined location within the controlled space.

The microphone 8 is connected to an A/D converter 9, which converts an analog signal indicative of the detected cancellation error from the microphone 8 into a digital signal, and the D/A converter 9 is connected to an LMS processor 10, which carries out an arithmetic processing for changing the filter coefficient W of the ADF 3. An output of the digital filter 4 is connected to the LMS processor 10, of which an output is connected to the ADF 3. The LMS processor 10 carries out the arithmetic processing for changing or updating the value of the filter coefficient W of the ADF 3, based on a suspension acceleration signal (reference signal) r(n) filtered through the digital filter 4, and the error signal (indicative of the cancellation error) e(n) generated by the microphone 8, by the use of an LMS (Least Mean Square) algorithm.

The suspension acceleration average value detector 11 detects an average value of suspension acceleration values delivered from the suspension acceleration sensor 1 in order to determine a state of a road surface on which the vehicle is traveling. Means for detecting the road surface state is not limited to the detector 11, but any other means may be employed insofar as it is capable of detecting the road surface state, such as a road surface sensor.

The high-speed Fourier transformer 12 carries out Fourier-transformation of the suspension acceleration signal from the suspension acceleration sensor 1 in order to determine a riding state of the vehicle, such as the number of passenger(s) and the seating position of the passenger(s). Means for determining the riding state is not limited to the transformer 12, but any other means may be employed insofar as it is capable of detecting the riding state, such as a load sensor and a vehicle height sensor.

The suspension acceleration average value detector 11 and the high-speed Fourier transformer 12 as well as a vehicle speed sensor 13 for detecting the vehicle speed are connected to an input of a discriminator 14, which determines the filter coefficient W of the ADF 3, based on outputs from the component elements 11 to 13. More specifically, the discriminator 14 determines a traveling condition of the vehicle (road surface state, vehicle speed, and riding state), and determines a value of the filter coefficient W for the ADF 3. Means for detecting the vehicle speed is not limited to the vehicle speed sensor 13, but any other means may be employed insofar as it is capable of detecting the vehicle speed information, such as a vehicle speed pulse detector.

An output of the discriminator 14 is connected to an input of a filter coefficient map memory 15, which stores value trains of the filter coefficient W of the ADF 3, which are written or read into or from the memory 15 in response to the traveling condition of the vehicle. That is, the filter coefficient map memory 15 is connected to the ADF 3 such that coefficient W values can be read and written from and into each other. The filter coefficient map memory 15 is formed, e.g. of a RAM.

Figure 3:
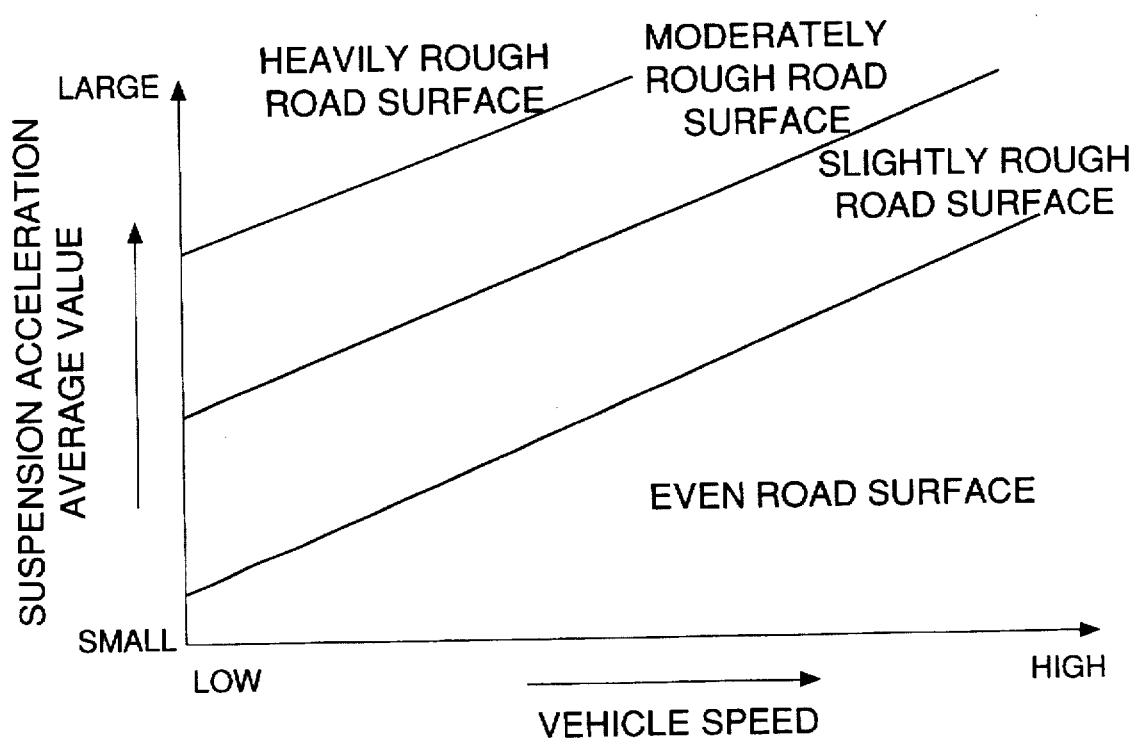
FIG. 3 shows a map used for determining the road surface state, based on a suspension acceleration average value and the vehicle speed.

FIG. 3 shows a map, which is used by the discriminator 14 for determining the road surface state from the suspension acceleration average value and the vehicle speed. In the figure, the ordinate represents the suspension acceleration average value and the abscissa the vehicle speed.

The discriminator 14 determines the road surface state during traveling of the vehicle by the use of the map, i.e. determines a state of a road surface on which the vehicle is traveling, out of a heavily rough or rugged road surface, a moderately rough road surface, a slightly rough road surface or an even road surface.

Figure 4:
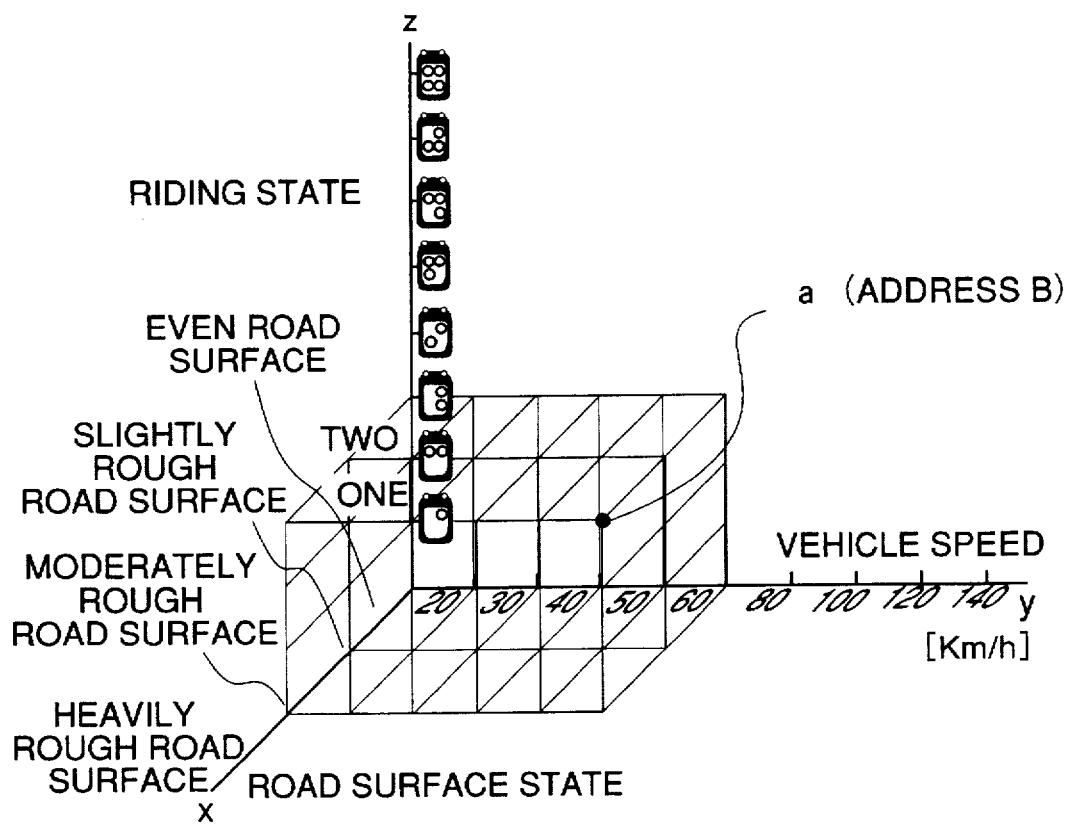
FIG. 4 shows a three-dimensional map used for determining the traveling condition of the vehicle.

FIG. 4 shows a three-dimensional map, which is also used by the discriminator 14 for determining the traveling condition of the vehicle. In the map, the x-axis, y-axis, and z-axis represent the road surface state, the vehicle speed, and the riding state, respectively. The road surface state, which is determined by the map of FIG. 3, is plotted along the x-axis, the vehicle speed which is detected by the vehicle speed sensor 13 along the y-axis, and the riding state (the number of passenger(s) and the seating position thereof) which is determined by the discriminator 14, based on an output from the high-speed Fourier transformer 12 along the z-axis.

Before describing the manner of determining the traveling condition, the riding state plotted along the z-axis will be described:

The discriminator 14 analyzes a frequency spectrum output from the high-speed Fourier transformer 12, to determine the number of passenger(s) and the seating position of the same from the analyzed frequency spectrum. For example, when two passengers including the driver are in the compartment of a four-passenger vehicle, the number of passengers (two) and the seating position of the passenger other than the driver, i.e. whether the passenger is seated next to the driver or in the rear right or rear left seat are determined.

After the road surface state, the vehicle speed and the riding state are determined as parameters representative of the traveling condition of the vehicle, one point is determined in the three-dimensional coordinate space of FIG. 4, based on the thus determined parameters, and one of predetermined addresses which corresponds to the one point is determined. The addresses are for designating the value trains of the filter coefficient stored in the filter coefficient map memory 15.

For example, when the driver is seated in the driver seat and a passenger in the rear seat, and the vehicle is traveling on a road with a slightly rough road surface at 50 to 60 km/h, i.e. when the traveling condition of the vehicle is indicated by a point a in FIG. 4, an address B corresponding to the point a is determined.

FIG. 5 schematically shows a format of value trains of the filter coefficients and addresses stored in the filter coefficient map memory 15.

For example, when the address B corresponding to the point a in FIG. 4 is determined in response to a change in the traveling condition of the vehicle, a filter coefficient value train corresponding to the address B is read and delivered to the ADF 3 as an initial value, and then a filter coefficient value train before the change in the traveling condition of the vehicle set in the ADF 3 is returned to the original address location of the filter coefficient map memory 15.

Then, the manner of carrying out control processing executed by the vibration/noise active control system constructed as above will be described with reference to flowcharts of FIGS. 6 to 9.

Figure 6:
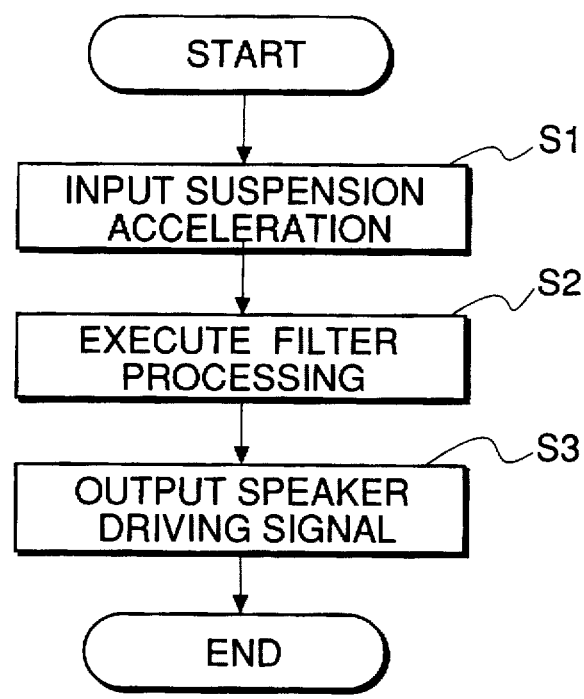
FIG. 6 is a flowchart showing an algorithm for carrying out a control processing executed by an ADF in FIG. 2.

FIG. 6 shows an algorithm for carrying out control processing executed by the ADF 3 in FIG. 2.

When a suspension acceleration signal is input from the suspension acceleration sensor 1 at a step S1, it is filtered based on the filter coefficient W which has been changed by the LMS processor 10, at a step S2, and then the filtered signal is output, as a speaker driving signal, via the D/A converter 5 and the amplifier 6 to the loudspeaker 7, at a step S3.

Figure 7:
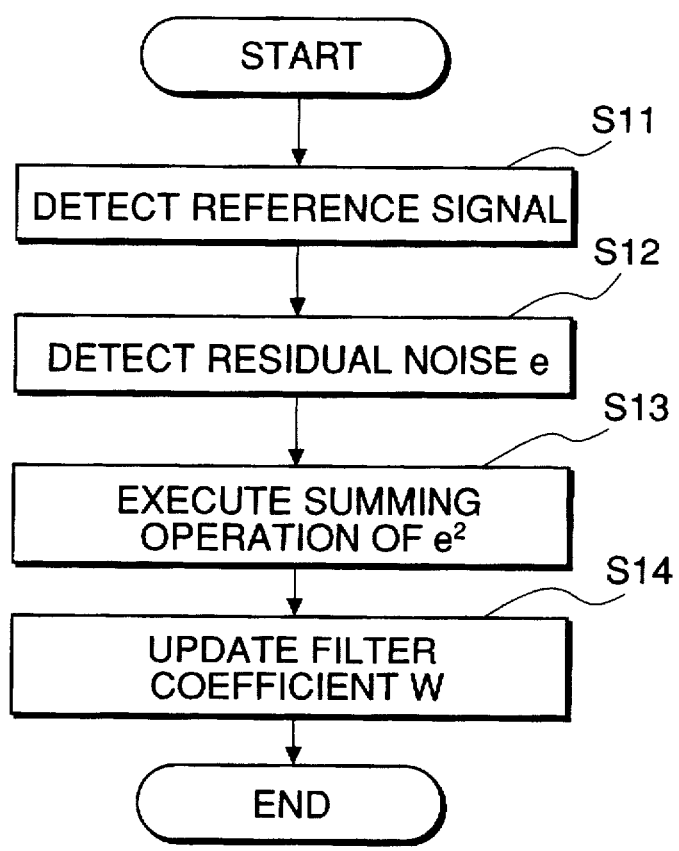
FIG. 7 is a flowchart showing an algorithm for carrying out a control processing executed by an LMS in FIG. 2.

FIG. 7 shows an algorithm for carrying out control processing executed by the LMS processor 10 in FIG. 2.

First, the suspension acceleration signal input from the suspension acceleration sensor 1 is filtered through the digital filter 4, and input as a reference signal r(n) to the LMS processor 10, at a step S11. At the same time, an error signal (residual noise) e(n) detected by the microphone 8 is supplied to the LMS processor 10 at a step S12. Then, at a step S13 the LMS algorithm which is a summing operation of error signals $e^2(n)$ is executed by the LMS processor 10 to calculate a value of the filter coefficient W by which a present value of the filter coefficient W is to be updated, based on the reference signal r(n) and the error signal e(n). The calculated filter coefficient W is delivered to the ADF 3 at a step S14.

Figure 8:
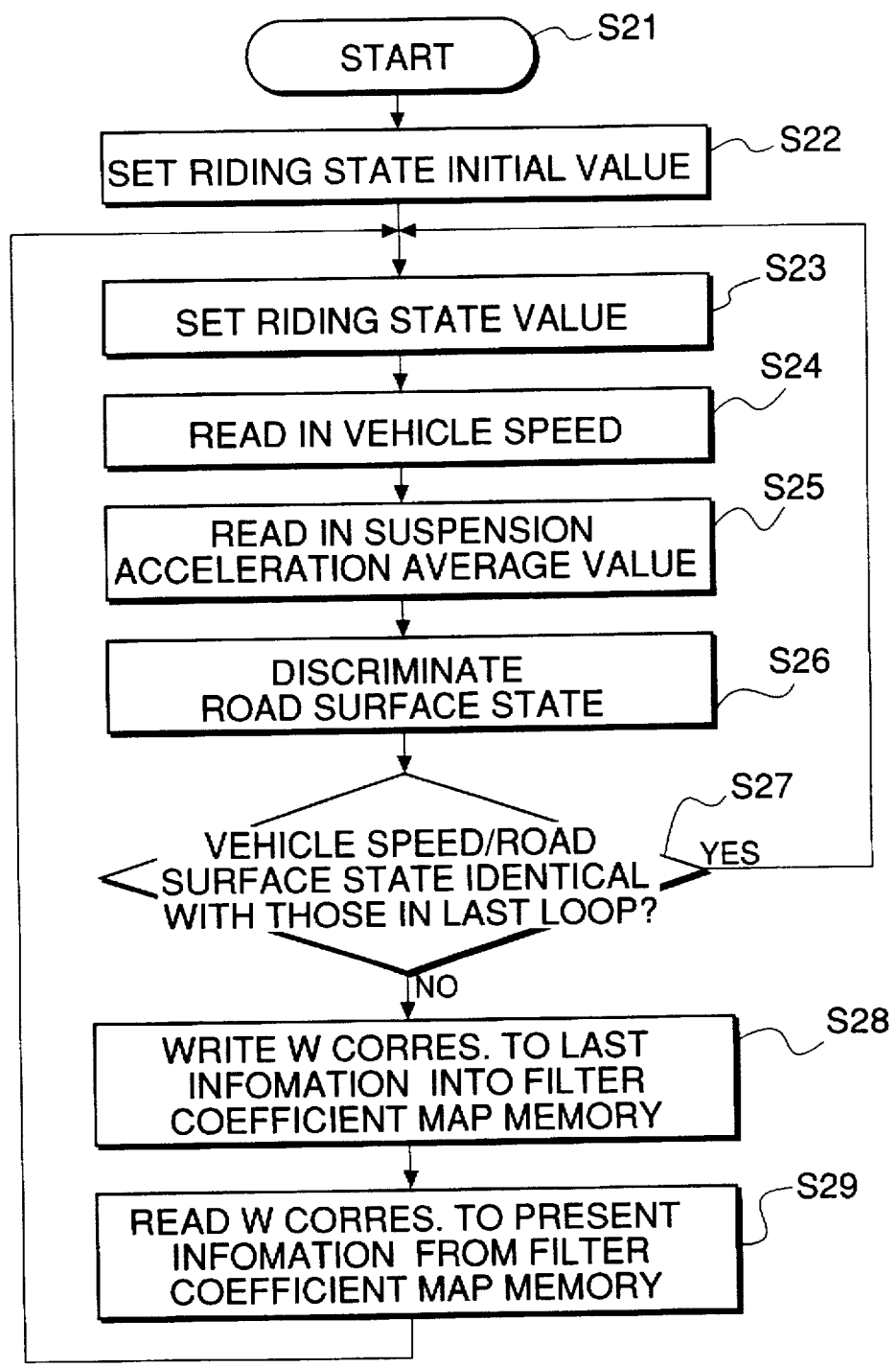
FIG. 8 is a flowchart showing a main routine of an algorithm for carrying out a control processing executed by a discriminator in FIG. 2.
Figure 9:
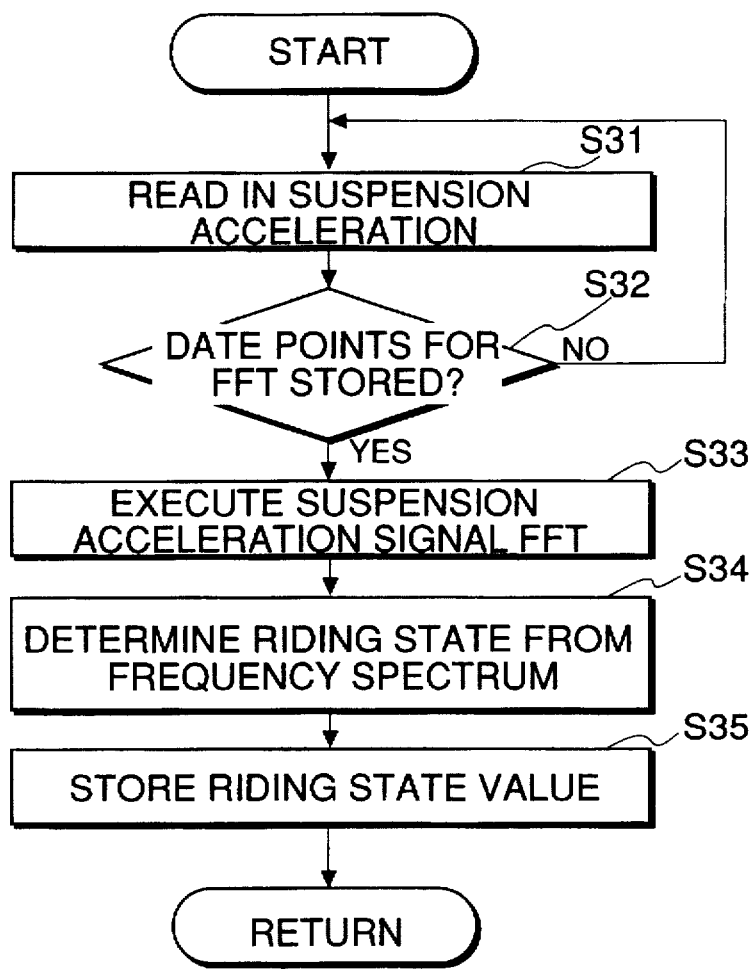
FIG. 9 is a flowchart showing an interrupt routine of the algorithm for carrying out the control processing executed by the discriminator in FIG. 2.

FIGS. 8 and 9 show an algorithm for carrying out control processing executed by the discriminator 14 in FIG. 2, wherein FIG. 8 shows a main routine of the algorithm while FIG. 9 shows an interrupt routine thereof.

In FIG. 8, when an ignition switch of the engine is turned on to start the engine at a step S21, an initial value of the riding state is set at a step S22.

Then, only when necessary data are obtained at a step S35 in FIG. 9, hereinafter referred to, to determine the riding state, the thus determined riding state is read in at a step S23. On the other hand, when the riding state cannot be determined, the program skips over the step S23 to a step S24, though not illustrated in the flowchart of FIG. 8.

At the step S24, the vehicle speed is read in from the vehicle speed sensor 13, and then the suspension acceleration average value is read in from the suspension acceleration average value detector 11 at a step S25. Based on the thus read-in suspension acceleration average value and vehicle speed, the road surface state is determined by the use of the road surface-determining map of FIG. 3, at a step S26.

Then, it is determined at a step S27 whether or not the vehicle speed and the road surface state are the same as those determined in the last loop of execution of the program, and if one or both of these parameter values is different from a corresponding parameter value or values in the last loop, an updated value of the filter coefficient W of the ADF 3 is written into the filter coefficient map memory 15 in FIG. 2, at an address corresponding to traveling condition information (riding state, vehicle speed, and road surface state) determined in the last loop, at a step S28. That is, as described before with reference to FIG. 4, the updated value of the filter coefficient W is stored into the address of the filter coefficient map memory 15, which has been determined based on the traveling condition information in the last loop.

Further, a value of the filter coefficient W is read out from the filter coefficient map memory 15, from an address corresponding to current traveling condition information, and then written into the ADF 3, at a step S29, followed by the program returning to the step S22 to repeatedly execute the above control processing.

On the other hand, if it is determined at the step S27 that the vehicle speed and the road surface state are the same as those in the last loop of execution of the processing, nothing is done, and then the program returns to the step S23.

FIG. 9 shows the interrupt routine of the algorithm for determining the riding state executed at the step S22 in FIG. 8.

First, a suspension acceleration signal is read in at a step S31, and then it is determined at a step S32 whether or not the high-speed Fourier transformer 12 has received data corresponding to points sufficient for the high-speed Fourier transformation (FFT) to be carried out. If the answer is negative (NO), the program is repeatedly executed to read in the suspension acceleration signals at the step S31 until sufficient data are received, and when the sufficient data are received, the FFT processing is executed based on the data, at a step S33.

Then, the riding state is determined based on a frequency spectrum obtained by the FFT processing, at a step S34, and the determined riding sate is temporarily stored into a RAM, not shown, at a step S35, followed by terminating the interrupt routine. The riding state stored at the step S35 is read in at the step S23 in FIG. 8.

As described above, according to the present embodiment, when there occurs a change in the traveling condition of the vehicle, the value of the filter coefficient W which has so far been applied is stored into the filter coefficient map memory 15 at an address corresponding to traveling condition information assumed immediately before the above change, and instead, a value of the filter coefficient W corresponding to present traveling condition information assumed immediately after the change is read out and set into the ADF 3 for use in the adaptive control as an initial value. As a result, it is possible to quickly respond to a change in the transfer characteristic even when an identification system with low identification performance, i.e. low identification speed is employed, thereby greatly enhancing the road noise-canceling control ability.

Further, a value the filter coefficient W which has actually been applied to the adaptive control is stored into the filter coefficient map memory 15 for use in the adaptive control. As a result, even in the case where the transfer characteristic changes due to aging of the vehicle chassis, e.g. deterioration of the same after a long term use, the vibration/noise control system according to the invention can exhibit excellent noise canceling control ability with high responsiveness to a change in the transfer characteristic, over a long term.

Figure 10:
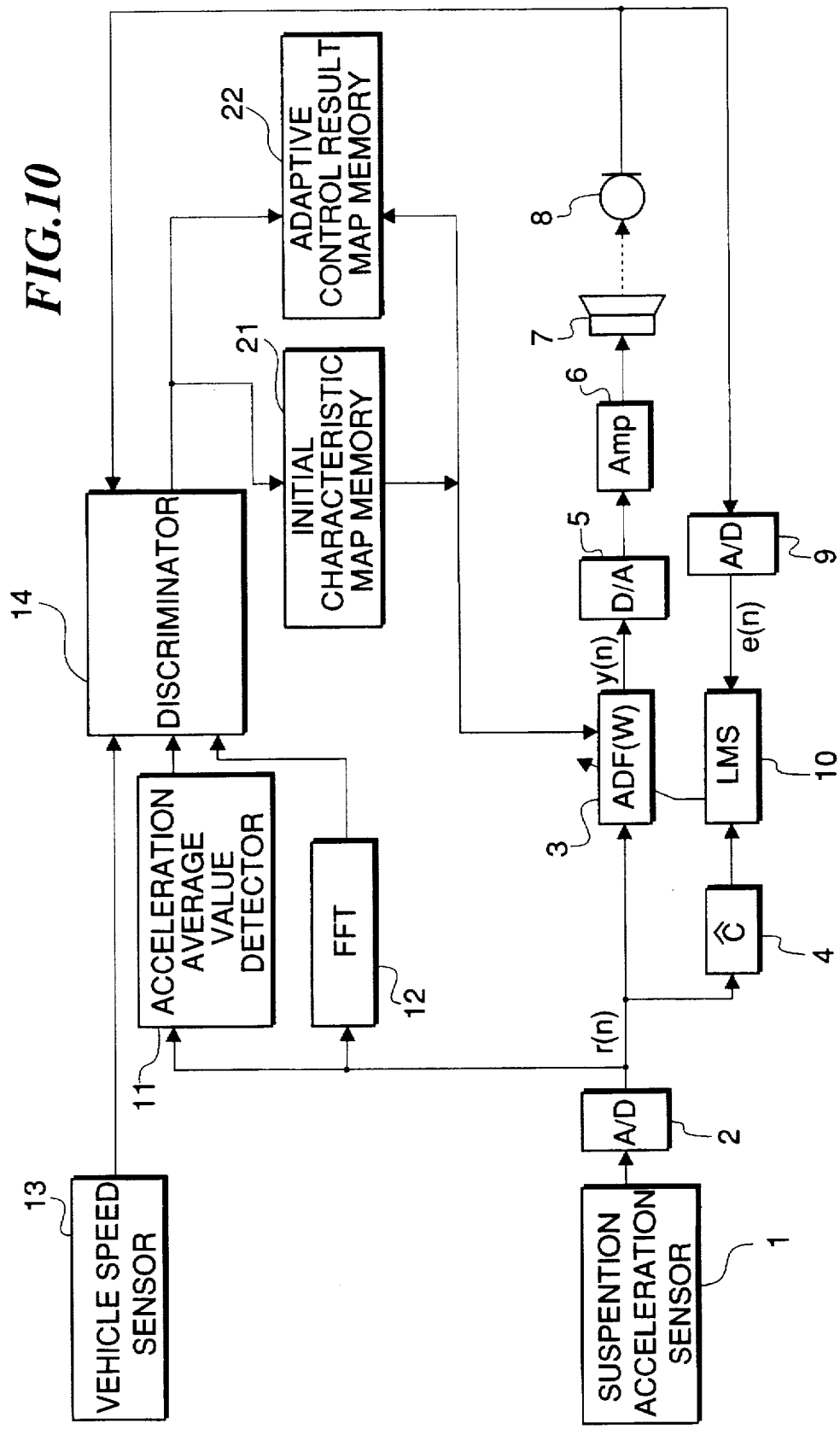
FIG. 10 is a block diagram schematically showing the whole arrangement of a vibration/noise active control system according to a second embodiment of the invention.

FIG. 10 schematically shows the arrangement of a vibration/noise active control system according to a second embodiment of the invention.

The second embodiment is distinguished from the first embodiment described above, only in that the filter coefficient map memory 15 employed in the first embodiment is replaced by an initial characteristic map memory 21 and an adaptive control result map memory 22, and an output from the microphone 8 is directly supplied to the discriminator 14. Except for these, the system according to the second embodiment is identical in construction and arrangement with the first embodiment. Elements and parts of the second embodiment are designated by the same reference numerals as corresponding ones in the system of the first embodiment of FIG. 2, and description thereof is omitted.

In the figure, the output of the discriminator 14 is connected to inputs of the initial characteristic map memory 21 and the adaptive control result map memory 22, and an output of the initial characteristic map memory 21 is connected to an input of the ADF 3. Further, the adaptive control result map memory 22 is connected to the ADF 3 such that coefficient W values can be read and written from and into each other. More specifically, the initial characteristic map memory 21 is only for reading out data stored therein, and the adaptive control result map memory 22 both for reading out data stored therein and writing data thereinto.

The initial characteristic map memory 21 is formed, e.g. of a ROM and stores a map of values of the filter coefficient W, which are estimated to be optimal to respective sets of traveling condition information (riding state, vehicle speed, and, road surface state) corresponding to a plurality of different traveling conditions. The map is previously stored into the memory 21 at a plant before delivery of the system.

The adaptive control result map memory 22 is formed, e.g. of a RAM for storing a map of values of the filter coefficient W which have once been applied to the adaptive control, similarly to the aforesaid filter coefficient map memory 15.

Further, an error signal from the microphone 8 is supplied to the discriminator 14, in order to determine which of the initial characteristic map memory 21 and the adaptive control result map memory 22 is to be selected for reading out a value of the filter coefficient W to be set into the ADF3. The memory selection-determining method will be described hereinafter.

Figure 11:
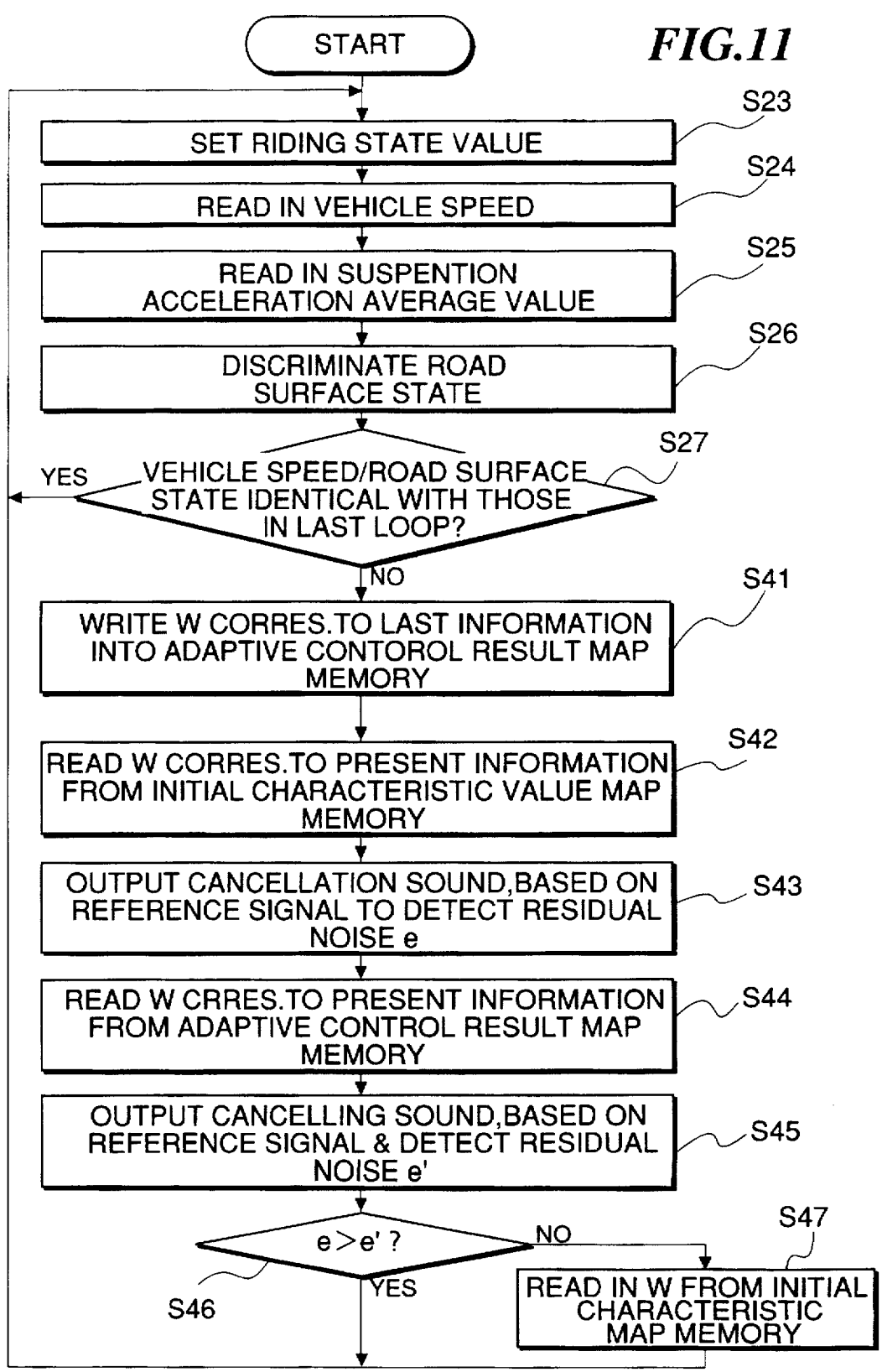
FIG. 11 is a flowchart showing an algorithm for carrying out a control processing executed by a discriminator in FIG. 10.

FIG. 11 shows an algorithm for carrying out control processing executed by the discriminator 14 in FIG. 10.

The control processing is distinguished from the control processing of FIG. 8 of the first embodiment, only in the manner of reading and writing map data. Therefore, steps corresponding to those in FIG. 8 are designated by identical numerals, and description thereof is omitted.

When it is determined at the step S27 that either the vehicle speed or the road surface state is different from the vehicle speed or the road surface state in the last loop, the program proceeds to a step S41, wherein a value of the filter coefficient W is written into the adaptive control result map memory 22, which corresponds to traveling condition information obtained in the last loop, similarly to the step S28 in FIG. 8.

Then, a value of the filter coefficient W is read out from the initial characteristic map memory 21, which corresponds to present traveling condition information, at a step S42. Then, the thus read-out filter coefficient W value is set into the ADF 3, and the reference signal r(n) is filtered by the ADF 3 using the thus set coefficient W value, to generate the canceling signal y(n). Then, based on the canceling signal y(n), a canceling sound is actually generated, whereby residual noise (cancellation error) is detected, at a step S43. The thus detected residual noise will be referred to as "residual noise value e".

Further, a value of the filter coefficient W is read out from the adaptive result map memory 22, which corresponds to the present traveling condition information, at a step S44, and a canceling sound is generated similarly to the above by the use of the thus read-out filter coefficient W value, to thereby detect residual noise, at a step S45. The thus detected residual noise will be referred to as "residual noise value e'".

Then, the residual noise value e is compared with the residual noise value e', at a step S46, and if the residual noise e is smaller than the residual noise e', i.e. if a higher noise canceling effect is obtained by the adaptive control based on the filter coefficient W read from the initial characteristic map memory 21, the filter coefficient W value is again read out from the initial characteristic map memory 21 and set into the ADF 3, at a step S47, followed by the program returning to the step S23 to repeatedly execute the above processing.

On the other hand, if it is determined at the step S46 that the residual noise e is larger than the residual noise e', i.e. if a higher noise reduction effect is obtained by the adaptive control based on the filter coefficient W read out from the adaptive result map memory 22, the program immediately returns to the step S23 without doing anything.

In the present embodiment, an interrupt routine is executed similarly to the the first embodiment, to detect the riding state to be set at the step S23.

As described above, according to the present embodiment, the initial characteristic map memory 21 storing optimal values the filter coefficient W corresponding to a plurality of sets of traveling condition information, and the adaptive control result map memory 22 for storing a value of the filter coefficient W obtained by actual adaptive control are employed, and filter coefficient W values are read out from the initial characteristic map memory 21 and the adaptive control result map memory 22 according to the present traveling condition information, and set into the ADF 3 to thereby carry out the adaptive control, and then one of the filter coefficient W values is selected depending upon the result of the adaptive control, for use in the adaptive control. As a result, noise reduction control can be achieved with excellent responsiveness.

Further, even if the adaptive control result based on the filter coefficient W value read out from the adaptive control result map memory 22 diverges for some reason, then the filter coefficient W value from initial characteristic map memory 21 as the initial characteristic of the ADF 3 is read out and applied during adaptive control. As a result, excellent noise canceling performance can be attained.

Figure 12:
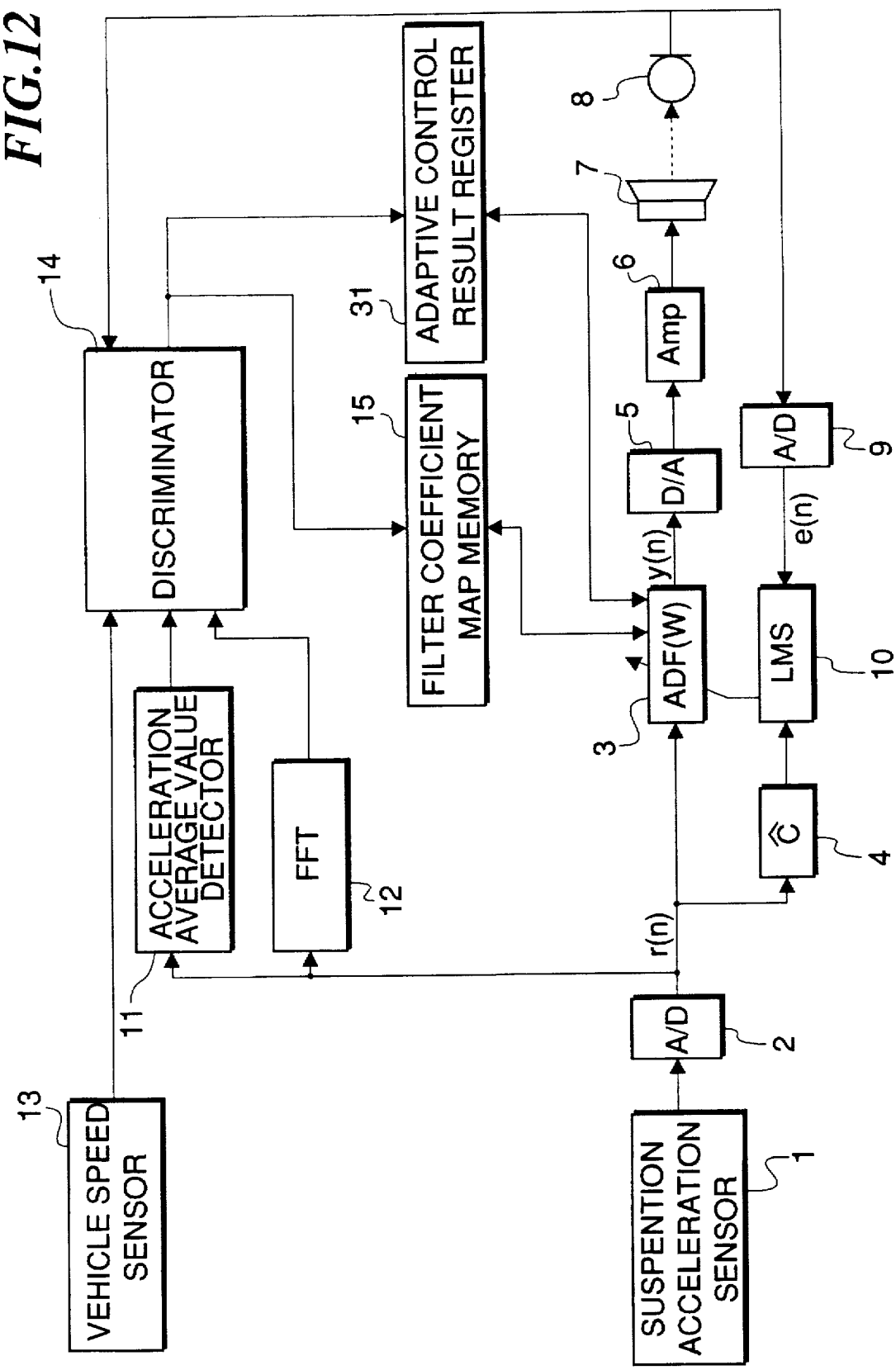
FIG. 12 is a block diagram schematically showing the whole arrangement of a vibration/noise active control system according to a third embodiment of the invention.

FIG. 12 schematically shows the arrangement of a vibration/noise active control system according to a third embodiment of the invention.

The third embodiment is distinguished from the first embodiment, only in that an adaptive control result register 31 is added which temporarily stores a present value of the filter coefficient W (adaptive control result) when the traveling condition information is changed, and an output from the microphone 8 is directly supplied to the discriminator 14. Except for these, the system according to the third embodiment is identical in construction and arrangement with the first embodiment. Elements and parts of the third embodiment are designated by the same reference numerals as corresponding ones in the system of the first embodiment, and description thereof is omitted.

The output from the discriminator 14 is also supplied to the adaptive control result register 31, which in turn is connected to the ADF 3 such that coefficient W values can be read and written from and into each other. That is, the filter coefficient W value which has been set to the ADF 3 and applied to the adaptive control is written into the filter coefficient map memory 15 as well as into the adaptive control result register 31.

Figure 13:
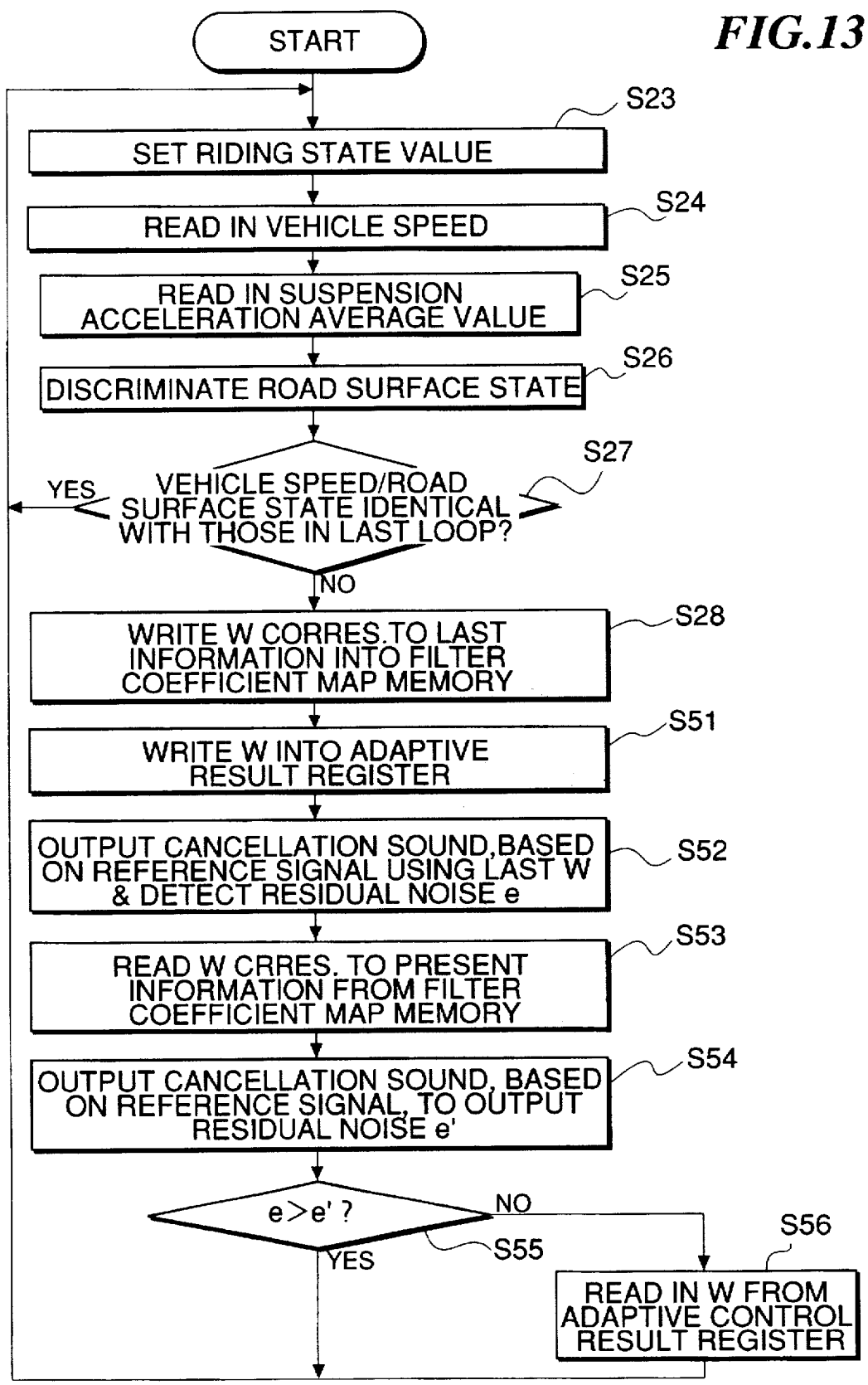
FIG. 13 is a flowchart showing an algorithm for carrying out a control processing executed by a discriminator in FIG. 12.

FIG. 13 shows an algorithm for carrying out control processing executed by the discriminator in FIG. 12.

The control processing according to the present embodiment is distinguished from the control processing of FIG. 8 executed by the first embodiment, only in the manner of controlling the filter coefficient map memory 15 and the adaptive control result register 31. Therefore, steps corresponding to those in FIG. 8 are designated by identical numerals, and description thereof is omitted.

At the step S28 in FIG. 13, a value of filter coefficient W is written into the filter coefficient map memory 15, which corresponds to traveling condition information obtained in the last loop, and at the same time the same coefficient W value is also written into the adaptive control result register 31, at a step S51.

Further, at a step S52, even after the change in the traveling condition detected at the step S27, the reference signal r(n) is filtered by the ADF 3 using the filter coefficient W value which has just been thus set into the ADF 3 and still remains therein, to thereby generate the canceling signal y(n). Then, a cancellation sound is actually generated, whereby residual noise (cancellation error) e is detected.

Next, a value of the filter coefficient W is read out from the filter coefficient map memory 15, which corresponds to present traveling condition information, at a step S53, and a canceling sound is generated based on the thus read-out filter coefficient W value similarly to the above, whereby residual noise e', is detected, at a step S54.

Then, the residual noise value e is compared with the residual noise value e', and if the residual noise value e is smaller than the residual noise value e', the filter coefficient W value is read out from the adaptive control result register 31 and set into the ADF 3, followed by the program returning to the step S23. On the other hand, if the residual noise value e is larger than the residual noise value e', nothing is done, and then the program returns to the step S23.

As described above, according to the present embodiment, when the traveling condition has changed, out of two kinds of filter coefficient W values, i.e. the filter coefficient W value applied to the adaptive control during the last traveling condition and the filter coefficient W value read out from the filter coefficient map memory 15, which corresponds to the present traveling condition, one coefficient W value which shows the higher noise canceling effect is selected and employed in the adaptive control as an initial value. As a result, when the traveling condition has changed, if employment of the result of the adaptive control carried out during the last traveling condition brings about the more excellent control responsiveness for some reason, a further excellent noise canceling effect can be obtained.

What is claimed is:

1. A vibration/noise active control system for an automotive vehicle having a compartment, comprising:

reference signal-detecting means for detecting a signal related to vibrations and noises generated within said compartment, as a reference signal;

canceling signal-forming means having an adaptive filter, for forming a canceling signal for canceling said vibrations and noises, by means of said adaptive filter, based on said reference signal;

converting means for converting said canceling signal formed by said canceling signal-forming means into a canceling sound;

error-detecting means for detecting a cancellation error between said canceling sound from said converting means and said vibrations and noises within said compartment to generate an error signal;

filter coefficient-changing means for changing a filter coefficient value of said adaptive filter, based on said error signal and said reference signal;

memory means for storing a plurality of filter coefficient values of said adaptive filter corresponding to a plurality of predetermined traveling conditions of said vehicle, each of which is determined by at least one of traveling speed of said vehicle, a state of a road surface on which said vehicle is traveling, and a riding state of said vehicle, wherein said memory means comprises first memory means storing initial filter coefficient values of said adaptive filter set beforehand, in a manner corresponding to said predetermined traveling conditions, and second memory means for storing filter coefficient values of said adaptive filter changed by said filter coefficient-changing means in a manner corresponding to said predetermined traveling conditions;

traveling condition-detecting means for detecting a traveling condition in which said vehicle is traveling; and control means for reading out a filter coefficient value of said adaptive filter corresponding to one of said predetermined traveling conditions of said vehicle to which said traveling condition detected by said traveling condition-detecting means corresponds, supplying said read-out filter coefficient value to said canceling signal-forming means to form and generate said canceling signal based on said read-out filter coefficient value, and storing said filter coefficient value of said adaptive filter changed by said filter coefficient-changing means based on said generated canceling signal, wherein when a change occurs in said traveling condition detected by said traveling condition-detecting means, said control means reads out from said first memory means an initial filter coefficient value corresponding to one of said predetermined traveling conditions to which said traveling condition detected by said traveling condition-detecting means immediately before occurrence of said change corresponds, reads out from said second memory means a filter coefficient value corresponding to one of said predetermined traveling conditions to which said traveling condition detected by said traveling condition-detecting means immediately after occurrence of said change corresponds, causes said canceling signal-forming means to form and generate said canceling signals based, respectively, on said initial filter coefficient value read out from said first memory means and said filter coefficient value read out from said second memory means, to execute vibration/noise control based on said generated canceling signals, and selects one of said initial filter coefficient value read out from said first memory means and said filter coefficient value read out from said second memory means, which has resulted in a smaller cancellation error, to apply same as an initial value of said adaptive filter.

2. A vibration/noise active control system for an automotive vehicle having a compartment, comprising:

reference signal-detecting means for detecting a signal related to vibrations and noises generated within said compartment, as a reference signal;

canceling signal-forming means having an adaptive filter, for forming a canceling signal for canceling said vibrations and noises, by means of said adaptive filter, based on said reference signal;

converting means for converting said canceling signal formed by said canceling signal-forming means into a canceling sound;

error-detecting means for detecting a cancellation error between said canceling sound from said converting means and said vibrations and noises within said compartment to generate an error signal;

filter coefficient-changing means for changing a filter coefficient value of said adaptive filter, based on said error signal and said reference signal;

memory means for storing a plurality of filter coefficient values of said adaptive filter corresponding to a plurality of predetermined traveling conditions of said vehicle, each of which is determined by at least one of traveling speed of said vehicle, a state of a road surface on which said vehicle is traveling, and a riding state of said vehicle;

traveling condition-detecting means for detecting a traveling condition in which said vehicle is traveling; and control means for reading out a filter coefficient value of said adaptive filter corresponding to one of said predetermined traveling conditions of said vehicle to which said traveling condition detected by said traveling condition-detecting means corresponds, supplying said read-out filter coefficient value to said canceling signal-forming means to form and generate said canceling signal based on said read-out filter coefficient value, and storing said filter coefficient value of said adaptive filter changed by said filter coefficient-changing means based on said generated canceling signal, wherein when a change occurs in said traveling condition detected by said traveling condition-detecting means, said control means causes said canceling signal-forming means to form and generate said canceling signal, based on a filter coefficient value of said adaptive filter changed by said filter coefficient-changing means immediately before occurrence of said change, and executes vibration/noise control based on said generated canceling signal, causes said canceling signal-forming means to form and generate said canceling signal, based on a filter coefficient value of said adaptive filter read out from said memory means according to said traveling condition detected by said traveling condition-detecting means immediately after occurrence of said change, and selects one of (i) said filter coefficient value changed by said filter coefficient-changing means immediately before occurrence of said change and (ii) said filter coefficient value read out from said memory means immediately after occurrence of said change, which has resulted in a smaller cancellation error, to apply same as an initial value of said adaptive filter.

3. A vibration/noise active control system as claimed in claim 2, wherein said memory means comprises first memory means for storing filter coefficient values of said adaptive filter changed by said filter coefficient-changing means in a manner corresponding to said predetermined traveling conditions, and second memory means for temporarily storing a filter coefficient of said adaptive filter changed by said filter coefficient-changing means when a change occurs in said traveling condition detected by said traveling condition-detecting means, and wherein when said change occurs in said traveling condition detected by said traveling condition-detecting means, said control means writes said filter coefficient value changed by said filter coefficient-changing means immediately before occurrence of said change into said second memory means, causes said canceling signal-forming means to form and generate said canceling signal, based on said filter coefficient value of said adaptive filter changed by said filter coefficient-changing means immediately before occurrence of said change, executes said vibration/noise control based on said generated canceling signal, causes said canceling signal-forming means to form and generate said canceling signal, based on said filter coefficient value of said adaptive filter read out from said first memory means according to said traveling condition detected by said traveling condition-detecting means immediately after occurrence of said change, and selects one of said filter coefficient value changed by said filter coefficient-changing means immediately before occurrence of said change and said filter coefficient value read out from said first memory means immediately after occurrence of said change, which has resulted in a smaller cancellation error, to apply same as said initial value of said adaptive filter.

* * * * *